United States Patent
Carl, Jr. et al.

Patent Number: 5,189,283
Date of Patent: Feb. 23, 1993

[54] CURRENT TO POWER CROSSOVER HEATER CONTROL

[75] Inventors: Frederick G. Carl, Jr.; Eric P. de Rouffignac, both of Houston, Tex.

[73] Assignee: Shell Oil Company, Houston, Tex.

[21] Appl. No.: 751,398

[22] Filed: Aug. 28, 1991

[51] Int. Cl.$^5$ .............................................. H05B 1/02
[52] U.S. Cl. .................................. 219/497; 219/501; 219/505; 219/508; 307/117
[58] Field of Search .............. 219/497, 501, 494, 499, 219/505, 508; 307/117; 340/588

[56] References Cited

U.S. PATENT DOCUMENTS

| | | | |
|---|---|---|---|
| 3,413,446 | 11/1968 | Rogers | 219/497 |
| 3,826,887 | 7/1974 | Pemberton | 219/497 |
| 4,362,924 | 12/1982 | Story et al. | 219/497 |
| 4,570,715 | 2/1986 | Van Meurs et al. | 166/302 |
| 4,572,299 | 2/1986 | Van Egmond et al. | 166/385 |
| 4,616,705 | 10/1986 | Stegemeier et al. | 166/250 |
| 4,704,514 | 11/1987 | Van Egmond et al. | 219/278 |

*Primary Examiner*—Mark H. Paschall
*Attorney, Agent, or Firm*—Del S. Christensen

[57] ABSTRACT

A control system which minimizes the start up time of heaters and sustains long term automatic control is provided. This control system automatically converts control time constant current to constant power when the power reaches the power set and provides that after power interruptions, control will revert back to constant current until constant power control is again called for. The heater controlled by the control system of this invention is preferably a subterranean heater having a long heating element.

14 Claims, 3 Drawing Sheets

CURRENT TO POWER CROSSOVER HEATER CONTROL

FIELD OF THE INVENTION

This invention relates to control of electrical current for heaters.

BACKGROUND TO THE INVENTION

Heaters are described in U.S. Pat. Nos. 4,570,715, 4,572,299, 4,616,705, and 4,704,514 which utilize copper heating cores. These heaters are useful for heating long intervals of subterranean formations. Heating subterranean formations can be useful to mobilize oils or pyrolize oil shales.

Copper is not a typical material for a heater core. Typically, a material with a higher resistance would be chosen but subterranean heaters can have heating elements of up to 1,000 feet long and elements with higher resistances would require excessively high voltages. An element with a low electrical resistance is therefore needed for these subterranean heaters. Copper-cored heaters fulfill the low resistance requirements, but have a shortcoming in that they have a very temperature-dependent resistance. The resistivity of copper changes by a factor of about four between 35° C. and a typical core operating temperature of about 800° C. When the cores are cold the heat that can be generated is limited by the current which can be applied. Heater control by maintaining a constant current is therefore preferred when the heater is warming up. After the heater is hot, constant current control becomes undesirable. Due to the heater's core electrical resistance increasing with temperature, a core which is too hot will generate even more heat if a constant amount of current is passed through it. Maintaining constant power results in the current being reduced if the electrical resistance of the core increases due to an increase in the core temperature.

Control of heaters which are providing heat to subterranean formations is further complicated by the large number of such heaters within a viable commercial application. Manually adjusting the voltages being applied to the heater cores to stay within current, power, and temperature constraints is a time consuming and labor intensive effort. Heating up periods are extended by failure to maintain maximum current and/or power.

It is therefore an object of the present invention to provide a method to control a heater which maintains a set point of either current, or power, depending on which variable is limiting the heater operation, and which automatically switches from one mode of control to the other as required in order to maintain a maximum heat output rate. It is a further object to provide such a controller which provides a smooth transfer from current control to power control when the power generated has increased to the power set point. It is another object to provide such a controller in which power supplied to the heaters automatically reverts to current control after power interruptions, followed by an automatic switch to power control once the power setting is reached.

SUMMARY OF THE INVENTION

These and other objects of the present invention are achieved by an apparatus comprising: a means to measure current which generates a measured current signal which varies with the electrical current going to the heater; a means to measure power which generates a measured power signal which varies with the power consumed by the heater; a current set point signal means which generates an electrical signal which corresponds to a maximum current; a power set point signal means which generates a power set point signal which corresponds to a maximum power; a comparator which receives the power set point signal and the power measurement signal and generates a transfer signal when the power measurement signal is equal to or greater than the power set point signal; a power-up signal means which detects power service increasing from essentially zero to a higher root mean square ("RMS") voltage and generates a power-up signal when the power service RMS voltage increase is detected; a means to generate a reset signal; an electronic latching device which receives the transfer signal, the power-up signal, and the reset signal, and generates a power control signal from when the transfer signal is detected until a power-up signal or a reset signal is detected and does not generate a power control signal from when a reset signal or a power-up signal is received until a transfer signal is received; a switching means which passes an input of the current set point signal to a set point output and which passes the measured current signal to a process output when the latching device is not generating a power control signal and when the latching device is generating a power control signal, passes an input of the power set point to the set point output, and the measured power signal to the process output; and a voltage controller means which controls voltage to the copper-cored heater to maintain the process output at or about the set point output.

These and other objects are also accomplished by a method to control a heater comprising the steps of: generating a current set point; generating a power set point; measuring the electrical current going to the heater and generating an electrical current signal which is proportional to the electrical current going to the heater; measuring the power comsumption of the heater and generating a power signal which is proportional to the power consumption; generating a transfer signal when the power is equal to or greater than the power set point; generating a power-up reset signal when service RMS voltage increases from essentially zero to a voltage which is higher than essentially zero; providing a means to generate a reset signal; generating a power control signal from the time a transfer signal is generated until either a power up signal or a reset signal is generated; selecting a set point signal and a process signal based on the criteria that when a power control signal is being generated, the set point signal is the power set point and the process signal is the power signal and when a power control signal is not being generated, the set point signal is the current set point and the process signal is the electrical current signal; and varying the voltage applied to the copper-cored heater to maintain the process signal at about the set point signal.

This control method and apparatus automatically provides a maximum rate of bringing these heaters to service temperatures from cold starts. Current control is provided when the current limits the average voltage applied to the heater. When the power, instead of the current, limits the electrical energy which can be applied to the heater, the power is held constant. This crossover control mechanism provides an automatic, rapid transfer and provides a latching onto power control wherein the heater stays in the power control mode until either a reset is provided or a power-up signal is generated after a shutdown of the power supply. This latching feature is required to prevent the control mode from switching each time the measured power dips below the power set point. After power interruptions, power is automatically restored to the heater under constant current control at the current control setpoint.

DETAILED DESCRIPTION OF THE INVENTION

Power to the heater of this invention may be controlled by, for example, phase-angle fired or zero fired silicone controlled rectifier (SCR) power controls. Phase-angle firing applies a portion of each cycle of alternating voltage to the heater, blocking a portion of each cycle. The cycles are switched on at non-zero voltages and the remainder of that cycle is passed to the heater, turning off at zero voltage. Zero firing applies a number of complete cycles of alternating voltage and blocks the remaining complete cycles of a time period. A convenient time period is one second. Zero firing opens voltage to the heater as the instantaneous amplitude of the voltage passes through zero. Zero firing is preferred because gating voltage on at non-zero levels results in undersirable current spikes. These current may spikes cause deterioration of heater electrical insulating materials.

When phase-angle firing is utilized, such as by a phase-angle fired silicone controlled rectifier power controller, RMS voltage, RMS current, and true power can be measured by many commercially available instruments. Ohio semitronics and Scientific Columbus are suppliers of such instrumentation.

When zero firing is utilized, only the voltage supplied to the heater can be controlled by commercially available controllers, such as a Loyola 480/960 VAC 1 phase, 3-wire 288 KVA full wave power controller. RMS voltage, RMS current, and true power are preferably measured by instrumentation which updates these values about once a second. Such instrumentation is not commercially available. Schematics of preferred circuitry for measuring RMS voltage, RMS current, and true power are shown in FIGS. 2 through 4, respectively.

Figures 2, 3:
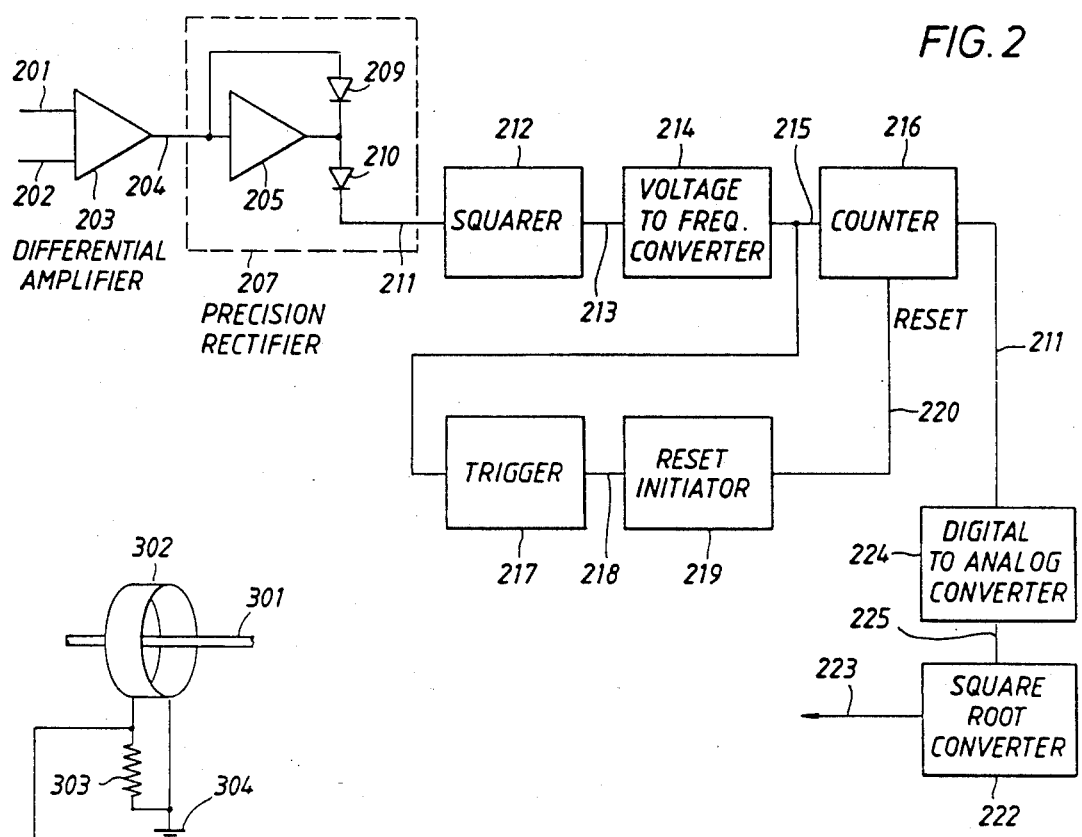
FIG. 2 is a schematic diagram of a preferred RMS voltage measurement circuit.
FIG. 3 is a schematic diagram of a preferred RMS current measurement circuit.
Figure 4:
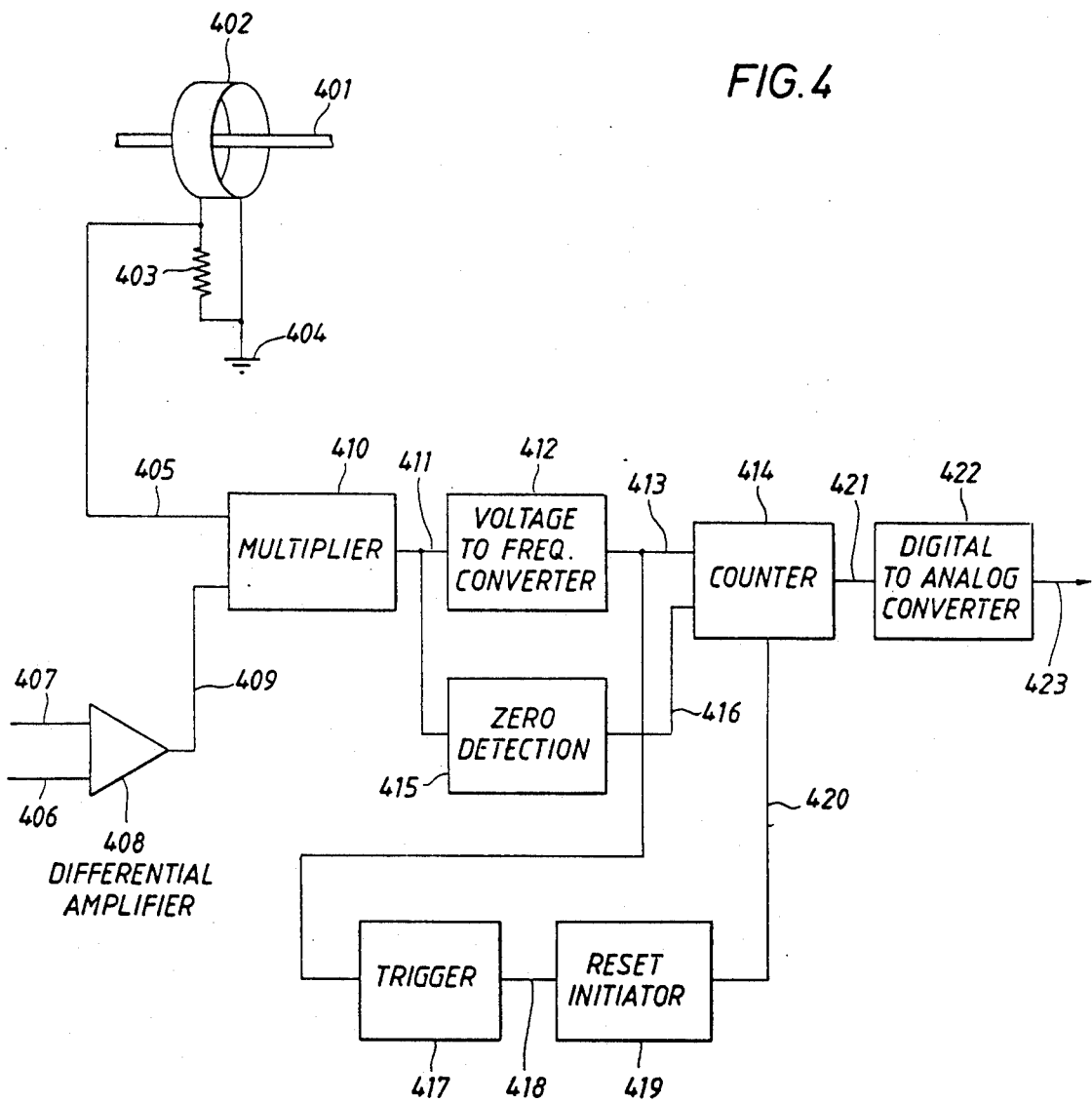
FIG. 4 is a schematic diagram of a preferred true power measurement circuit.

The measurement circuits displayed in FIGS. 2 through 4 represent another novel and nonobvious aspect of the preferred embodiment of the present invention. These circuits provide measurement values which are updated every second. Precise and rapid measurement of variables was not previously possible for zero-fired SCR power controllers.

The process signals to the heater-firing control apparatus of this invention are preferably buffered by a high impedance device. The control functions downstream of the buffer will therefore not interfere with the measurement of the process signals. An FET amplifier with a gain of one can serve as this buffer. Set point signals must be generated for both current and power to the heater. The apparatus preferably allows local or remote adjustment of these set points.

A comparator receives a power set point signal and a power measurement. When the measurement reaches the set point, the comparator generates a transfer signal. This signal then goes to latching device, which activates a switching device which changes the set point and process signal from the current set point and the current measurement, respectively, to the power set point and power measurement, respectively. This switching device is preferably an electronic analog switch due to the rapid response possible. An example of a useful analog switch is a Siliconix DG189BP. Switching control immediately upon the power reaching the set point results in a smooth transfer of control because there is no offset at the instant of the transfer.

After the switching device converts the control mode to power control, the latching device causes the mode to stay in the power control mode until one of two signals are activated. First, a reset signal will cause the latching device to revert back to a current control mode. This reset can be, for example, local, remote, manual, automatic, or computer activated. The second signal which can cause the latching device to revert back to current control mode is a power-up signal. The power-up signal is generated when the power service is detected to go from near zero volts to a voltage near service level. An interruption in the power service will therefore not require a manual reset before a start-up can be initiated. If the interruption in power service is of a short duration, the heater core may still be hot enough to require power control. As the current is restored under the constant current control, if the core is hot enough to require power control, this apparatus will detect the power exceeding the set point. The comparator will then generate a transfer signal which will cause the latching device and switching device to switch back to power control. The heater can therefore be restarted whether or not the cores have cooled to a point which requires current control.

The electrical power to the heater may be either DC or AC. The same control algorithm applies. Alternating current power is preferred.

Figure 1:
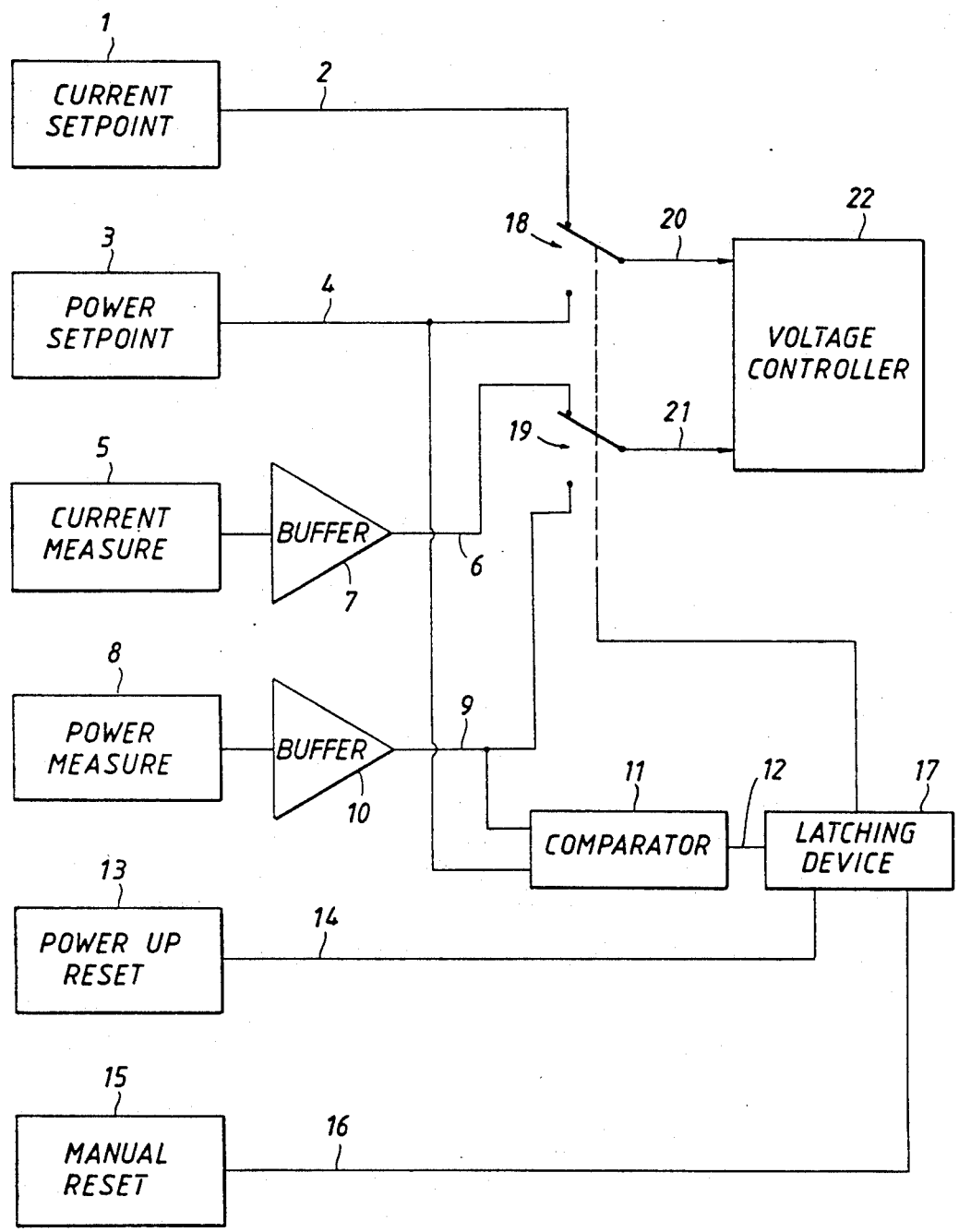
FIG. 1 is a schematic diagram of the apparatus of the present invention.

Referring now to FIG. 1, the current set point is established by a known means 1, generating an analog current set point signal 2. A power set point is established by a known means 3, and generates an analog power set point signal 4. Current going to the heater can be measured and the measurement is converted to an analog electronic signal by known means 5. Because the control mechanism of this invention typically requires some current, a buffer 7 can be incorporated in the current measurement signal to isolate the measured signal from draws of current by the control circuitry. Power consumed by the heater is measured and converted into an analog signal by known means 8 generating a power measurement signal 9. A buffer 10 can be incorporated to prevent the control circuitry from affecting the measurement signal or power measurement devices. The power set point signal 4 and the power measurement signal 9 are compared by a comparator 11. The comparator generates a transfer signal 12 when the value of the power measurement signal equals or exceeds the value of the power set point signal.

A power-up reset circuit 13 generates a power-up signal 14 when supply power service is first detected.

A manual reset circuit 15 generates a reset signal 16 in response to local, remote, manual, automatic, or computer-activated instructions.

A latching device module 17 activates or deactivates an electronic or mechanical single pole, double throw switch according to the status of the transfer signal 12, power-up signal 14, and the manual reset signal 16. From the time a transfer signal 12 is detected until either a manual reset signal 16, or a power-up reset signal 14 is detected, the latching device will provide as a set point and process signal 20 and 21, respectively, the power set point signal 4 and the power measurement signal 6, respectively, via switches 18 and 19, respectively. Mechanical switches are shown in FIG. 1, but electronic switches are preferred due to the more rapid response.

Many controllers require that the measured process signal 21 be inverted before it is directed to a controller. An inverter, not shown, may be incorporated to convert the process signal 21 to invert this signal if this is necessary. A voltage controller 22 will control the process to result in the process value approaching the set point value by known means. Typically, the voltage is controlled by a proportional-integral controller.

Referring to FIG. 2, the RMS voltage is measured based on voltage samples 201 and 202, which are from the leads to the heater. The system shown measures voltage for single-phase power. The samples 201 and 202, are inputs to a differential amplifier, 203, which produces a signal which is equal to the difference between the two samples to produce one instantaneous differential voltage signal, 204. The differential voltage signal will vary as a sine wave about zero. The portions of this sine wave which are negative values are inverted by a precision rectifier, 207. The precision rectifier comprises an inverter, 205, and diodes 209 and 210, which permit the positive charges to pass through to the rectified signal, 211. The rectified signal is then squared by the squarer, 212, to obtain a signal, 213, which is proportional to the square of the differential voltage. An acceptable device to perform this squaring is an Analog Device AD533LD, IC. The conversion of the instantaneous voltage to an integrated voltage is accomplished by first converting the instantaneous voltage to a modulated signal of identical amplitude peaks which vary in frequency with the amplitude of the complex wave input. This is accomplished by a voltage to frequency converter, 214. An acceptable voltage-to-frequency converter is an Analog Device AD537KD. This converter produces pulses which vary within a zero to 10 KHZ bandwidth. The frequency varies proportionally with the amplitude of the squared differential voltage, 213. Because the number of pulses in a small time period in signal 215 is proportional to the square of voltage times the length of time, the number of pulses can be summed to provide a digital signal which is proportional to the RMS voltage squared times the length of the time period. A counter, 216, counts the pulses in signal 215 and provides such a signal, 221. The acceptable counter may be assembled utilizing four CD4416BE, ICs. The counter is reset each second by a trigger, 217, and reset initiator, 219. Of course, different time intervals could be used, but one-second intervals are convenient.

The trigger utilizes the voltage-to-frequency converter output signal, 215, and sends a signal, 218, to the reset initiator, 219, when pulses are no longer detected. This signal goes to zero when the pulses stop. The reset initiator, 219, detects the drop in the signal from the trigger, 218, and sends a pulse signal, 220, when this drop is detected. The pulse signal from the reset initiator latches the present count then resets the counter, 216. The output signal of the counter, 221, is therefore updated each second, with the previous value held in latches until it is updated. The output from the counter, 221, goes to a digital-to-analog converter, 224, which converts the digital signal to an analog signal, 225. The analog signal, 225, then goes to a square root converter, 222. The output, 223, of the square root converter, 222, is a signal which is proportional to the true RMS voltage measured between the samples 201 and 202.

FIG. 3 is a schematic of the current measurement device preferred when the heater is powered by zero firing. Referring to FIG. 3, a signal proportional to the instantaneous current, 305, is generated by a transformer, 302, which surrounds a power supply cable, 301. A 200:5 toroidal transformer is acceptable. With single-phase firing, and two legs of cables, the current going to one leg is measured. The transformer's output is dropped across a resistor, 303, to a common ground, 304. A 0.4 ohm resistor is preferred. This provides an instantaneous signal, 305 having an acceptable signal to noise ratio. The current signal, 305, preferably goes to a high impedance device, 306, such as an FET amplifier. This buffers the input signal from the loading effects of the measurement circuitry. The high impedance device produces an output, 307, which is equal to the amplitude of the input signal, 305. The output of the high impedance device, 307, is then rectified by a precision rectifier, 309. The precision rectifier can comprise an inverter, 308, and diodes, 311 and 312, to produce a signal, 313, equal to the absolute value of the high impedance device output, 307. The rectified signal is then squared by the squarer, 314, to provide a signal, 315, proportional to the square of the instantaneous current signal. The squared signal is then modulated by a voltage-to-frequency converter, 316, as in the RMS voltage measurement. The voltage-to-frequency converter produces a stream of pulses, 317, of constant amplitude at a frequency which varies proportionally with the amplitude of the squared, rectified current, signal, 315. The number of pulses in the stream of pulses are then counted by the counter, 318, to arrive at an integration of the squared, rectified current measurement, 323. As with the RMS voltage measurement circuitry described above, the counter, 318, is reset by a trigger, 319, and a reset initiator, 321. The trigger, 319, generates a signal when pulses are detected within the stream of pulses. When the pulses stop, the signal from the trigger, 320, drops to a zero value. The reset initiator, 321, generates a pulse in the reset signal, 322, when the drop in the signal from the trigger, 320, is detected. The reset signal, 322, will reset the counter, 318. The integrated, squared, rectified current signal, 323, is then processed by a digital-to-analog converter, 326, which produces an analog signal, 327, which is proportional to the digital counter output signal, 323. The analog signal, 327, goes to a square root converter, 324, which generates a signal, 325, which is equal to the square root of the integrated, squared, rectified current signal, 323. This square root signal is proportional to the RMS current, and is updated each second by this circuit.

The components of the RMS voltage measurement circuit described above are also acceptable for use in the RMS current measurement circuit.

The true power is preferably measured by a circuit which also incorporates a voltage-to-frequency converter and a counter to integrate the power over a one-second time frame.

FIG. 4 is a schematic of the true power measurement device preferred when the heater is powered by zero firing. Referring to FIG. 4, an instantaneous current signal, 405, is generated like it is generated for the RMS current measurement. The current signal is generated by a transformer, 402, which surrounds a power supply cable, 401. A 200:5 torroidal transformer is acceptable. The transformer's output is dropped across a resistor, 403, to a common ground, 404, to provide a noise-free instantaneous amperage signal, 405. A differential voltage signal, 409, is provided by a differential amplifier, 408, which subtracts voltage samples from the supply cables, 406 and 407. The differential voltage signal, 409, is proportional to the difference between the voltage samples 406 and 407. The differential voltage signal, 409, is then multiplied by the instantaneous amperage signal, 405, by a multiplier, 410, to provide an instantaneous power signal, 411. An acceptable multiplier device is an Analog Devices AC533LD multiplier. The instantaneous power signal is the integrated like the RMS current and voltage signals are integrated as described above. The instantaneous power signal is integrated by first modulating the signal to a stream of pulses which vary in frequency with the value of the instantaneous power signal, 413, using a voltage-to-frequency converter, 412. The current and voltage may, over a portion of the cycle, be out of phase. This results in a negative instantaneous power. A zero detection chip, 415, may be necessary to recognize that the instantaneous power, 411, is negative, and cause the counter, 414, to subtract pulses over the time period rather than add pulses. A signal, 416, from the zero detection chip, 415, can trigger the counter to subtract pulses. The counter can be reset by a trigger, 417, and a reset initiator, 419. The trigger, 417, generates a positive signal when pulses are being generated by the voltage-to-frequency converter 412. The signal generated by the trigger, 418, is routed to the reset initiator, 419, which generates a pulse when the signal from the trigger drops. The reset initiator, 419, generates this pulse in a signal to the counter, 420, which causes the counter to reset. The counter generates a signal, 421, which is updated each time period to a value proportional to the count of pulses counted in the last second. This signal is processed by a digital-to-analog converter, 422, generating an output, 423, which is proportional to the true power measured over the time period. Acceptable chips for the voltage-to-frequency converter and counters are those described above as useful in the RMS measurement circuit. Again, time periods other than one second can be used, but one-second time intervals are convenient.

The foregoing description of the invention is merely intended to be explanatory thereof, and various changes in the details of the described method and apparatus may be made within the scope of the appended claims without departing from the spirit of the invention.

We claim:

1. An apparatus to control electrical current to a heater which consumes power to generate heat comprising:
   a) a means to measure current, said means which generates a measured current signal which varies with the electrical current going to the heater;
   b) a means to measure power consumed by the heater, said means which generates a measured power signal which varies with the power consumed by the heater;
   c) a current set point signal means which generates a current set point signal which corresponds to a maximum current;
   d) a power set point signal means which generates a power set point signal which corresponds to a maximum power;
   e) a comparator which receives the power set point signal and the measured power signal and generates a transfer signal when the measured power signal is equal to or greater than the power set point signal;
   f) a power-up signal means which detects power service increasing from essentially zero RMS volts to a higher RMS voltage and generates a power-up signal when the power service RMS voltage increase is detected;
   g) a means to generate a reset signal;
   h) an electronic latching device which receives the transfer signal, the power-up signal, and the reset signal, and generates a power control signal from when the transfer signal is detected until a power-up signal or a reset signal is detected and does not generate a power control signal from when a reset signal or a power-up signal is received until a transfer signal is received;
   i) a switching means which passes an input of the current set point signal to a set point output and which passes the measured current signal to a process output when the latching device is not generating a power control signal and when the latching device is generating a power control signal, passes an input of the power set point to the set point output and the measured power signal to the process output; and
   j) a voltage controller means which controls voltage to the heater to maintain the process input at about the set point output.

2. The apparatus of claim 1 wherein the switching device is an analog switch.

3. The apparatus of claim 1 wherein the voltage controller is a proportional controller.

4. The apparatus of claim 1 wherein the voltage controller is a proportional-integral controller.

5. The apparatus of claim 1 wherein the voltage controller is a proportional-integral-derivative controller.

6. The apparatus of claim 1 further comprising a buffer which amplifies the measured current signal to a current signal at the same voltage, but capable of supplying an increased amount of current without reducing the voltage of the measured current signal and the buffered measured current means goes to the switching device means.

7. The apparatus of claim 1 further comprising a buffer which amplifies the measured power signal to a power signal at the same voltage but capable of supplying an increased amount of current without reducing the voltage of the measured power signal and the buffered measured power signal goes to the switching device means.

8. The apparatus of claim 1 wherein the reset signal is generated in response to a manual reset switch.

9. The apparatus of claim 1 wherein the heater is a coppercored heater for heating long intervals of a subterranean formation.

10. The apparatus of claim 1 wherein the heater is fired by zero-fired alternating electrical current.

11. The apparatus of claim 10 wherein the measured current signal means comprises:
   a) a precision rectifier which rectifies an instantaneous current signal;
   b) a squarer which squares the rectified instantaneous current signal;
   c) a voltage-to-frequency converter which modulates the squared rectified instantaneous current signal to a stream of pulses;
   d) a counter which generates a digital signal which corresponds to the number of pulses in the stream of pulses from the voltage-to-frequency converter wherein the counter is reset periodically;
   e) a digital-to-analog converter which converts the pulse count from a digital to an analog value; and
   f) a square root converter to generate a signal which is proportional to the square root of the output of the digital-to-analog converter.

12. The apparatus of claim 10 wherein the measured power signal means comprises:
   a) a multiplier which multiplies an instantaneous current signal by an instantaneous voltage signal to produce an instantaneous power signal;
   b) a voltage-to-frequency converter which modulates the instantaneous power signal to a signal of pulses wherein the pulses are of a frequency which is proportional to the value of the instantaneous power signal;
   c) a counter which counts the pulses of the modulated instantaneous power signal, generating a digital signal which is proportional to the true power utilized by the heater wherein the counter subtracts pulses representing power when the product of the instantaneous current and instantaneous voltage is negative, and the counter is periodically reset.

13. The apparatus of claim 12 further comprising a digital-to-analog converter which converts the digital true power signal to an analog signal.

14. A method to control electrical energy to a heater comprising the steps of:
   generating a current set point;
   generating a power set point;
   measuring the electrical current going to the heater and generating an electrical current signal which is proportional to the electrical current going to the heater;
   measuring the power consumption of the heater and generating a power signal which is proportional to the power consumption;
   generating a transfer signal when the power is equal to or greater than the power set point;
   generating a power-up signal when service RMS voltage increases from essentially zero to a voltage which is higher than essentially zero;
   providing a means to generate a reset signal;
   generating a power control signal from the time a transfer signal is generated until either a power-up signal or a reset signal is generated;
   selecting a set point signal and a process signal based on the criteria that when a power control signal is being generated, the set point signal is the power set point and the process signal is the power signal, and when a power control signal is not being generated, the set point signal is the current set point and the process signal is the electrical current signal; and
   varying the voltage applied to the copper-cored heater to maintain the process signal at about the set point signal.

* * * * *